US012199289B2

United States Patent
Liu et al.

(10) Patent No.: US 12,199,289 B2
(45) Date of Patent: Jan. 14, 2025

(54) NICKEL/NICKEL HYDROXIDE ELECTRODE CATALYST, PREPARATION METHOD THEREOF AND APPLICATION THEREOF

(71) Applicant: North China Electric Power University, Beijing (CN)

(72) Inventors: Jianguo Liu, Beijing (CN); Wen Kuang, Beijing (CN); Tianrang Yang, Beijing (CN); Cheng Wang, Beijing (CN); Zhixiang Cui, Beijing (CN); Tao Chen, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 18/789,528

(22) Filed: Jul. 30, 2024

(65) Prior Publication Data
US 2024/0396055 A1    Nov. 28, 2024

(51) Int. Cl.
*H01M 4/90* (2006.01)
*H01M 4/86* (2006.01)
*H01M 4/88* (2006.01)

(52) U.S. Cl.
CPC ....... *H01M 4/9041* (2013.01); *H01M 4/8605* (2013.01); *H01M 4/8857* (2013.01); *H01M 4/8882* (2013.01); *H01M 4/8896* (2013.01)

(58) Field of Classification Search
CPC ............. H01M 4/8605; H01M 4/8857; H01M 4/8882; H01M 4/8896; H01M 4/9016; H01M 4/9041
See application file for complete search history.

(56) References Cited

FOREIGN PATENT DOCUMENTS

| CN | 108163903 | * | 6/2018 |
| CN | 108163903 | A | 6/2018 |
| CN | 116555801 | * | 8/2023 |
| CN | 116555801 | A | 8/2023 |

OTHER PUBLICATIONS

English translation of CN Publication 116555801, Aug. 2023.*
English translation of CN Publication 108163903, Jun. 2018.*
CNIPA Application No. 202311675049.2, First Office Action dated Jan. 11, 2024, Original Chinese, pp. 1-5.
CNIPA Application No. 202311675049.2, First Office Action dated Jan. 11, 2024, Machine translation generated Jul. 30, 2024, pp. 1-6.

* cited by examiner

*Primary Examiner* — Brittany L Raymond
(74) *Attorney, Agent, or Firm* — Addison D. Ault; IPGentleman Intellectual Property Services, LLC

(57) ABSTRACT

Disclosed are a nickel/nickel hydroxide electrode catalyst, a preparation method thereof and an application thereof, the catalyst includes a porous matrix structure and a nanosheet, where the nanosheet is doped in the porous matrix structure, a mass percentage of the porous matrix structure is 95%-99%, a mass percentage of the nanosheet is 1%-5%, and a mass density of the nanosheet is 12-15 mg/cm$^2$; and the porous matrix structure is nickel, and the nanosheet is nickel hydroxide in β configuration. The present disclosure develops an electrode catalyst with higher catalytic efficiency and a simpler preparation method based on the Ni-based catalysts to achieve efficient application of hydrogen energy.

5 Claims, 3 Drawing Sheets

NICKEL/NICKEL HYDROXIDE ELECTRODE CATALYST, PREPARATION METHOD THEREOF AND APPLICATION THEREOF

TECHNICAL FIELD

The present disclosure belongs to the technical field of electrode catalysts, and particularly relates to a nickel/nickel hydroxide electrode catalyst, a preparation method thereof and an application thereof.

BACKGROUND

With the advantages of high energy density, green and pollution-free, diverse sources, abundant reserves, and wide range of applications, hydrogen energy is favored by the market in terms of its long-term development. As an energy carrier, hydrogen involves a vast industrial chain on both the production and application sides.

Taking the application side of hydrogen as an example, it is usually used as a fuel for a fuel cell to convert chemical energy into electrical energy through electrochemical reactions. A fuel cell is mainly composed of a cathode, an anode, and an electrolyte. Take alkaline fuel cell (AFC) as an example, at the cathode (air electrode), oxygen molecules gain electrons and are reduced to hydroxide ions, that is, $O_2+H_2O+2e- \rightarrow 2OH^-$. The hydroxide ions migrate to the anode (fuel electrode) through KOH solution electrolyte, and undergo an oxidation reaction with the fuel, that is, $2OH^-+H_2 \rightarrow 2H_2O+2e-$. Electrons released through the anode reaction return to the cathode through an external circuit, and products generated therefrom are discharged from the anode.

Anode materials for the fuel cells need to have good electrical conductivity, stable physical and chemical properties, excellent thermal compatibility, and other advantages to ensure smooth electrochemical reactions on the anode side. At present, Ni-based catalysts are still considered as the anode materials with the best overall effects due to their high electronic conductivity, strong catalytic activity, and low cost.

For example, the Chinese patent CN113725452A provides a heterojunction electrocatalyst of close-packed hexagonal nickel and polycrystalline nickel, preparation methods thereof and an application thereof. First, nickel(II) acetylacetonate is used as a precursor, oleylamine is used as a solvent, and anhydrous glucose is used as a surfactant, a close-packed hexagonal nickel precursor is synthesized in an organic solution through a simple colloidal method; and then, annealing is performed in a reducing atmosphere to prepare a heterojunction electrocatalyst of hexagonal close-packed/face-centered cubic nickel, that is, the heterojunction electrocatalyst of polycrystalline nickel. Through mutual adjustment of interfacial electronic structure, the catalyst can simultaneously optimize binding energies of hydrogen and hydrogen-oxygen species, the formation energy of water is also reduced, such that the catalyst exhibits excellent hydrogen oxidation performance and has great potential in the field of alkaline medium hydrogen oxidation reactions. Additionally, the patent also provides two methods for preparing face-centered cubic nickel in different sizes.

Similarly, the Chinese patent CN112117469A provides a nickel foam electrocatalyst and a preparation method thereof. The nickel foam electrocatalyst is obtained by carbonizing the nickel foam after etching with a Schiff base coordination. The preparation method includes the following steps: 1) activating the nickel foam with acid to obtain activated nickel foam; 2) performing a reaction between an amino compound and an aldehyde compound to obtain a Schiff base; 3) performing a solvothermal reaction of the Schiff base and the activated nickel foam to obtain Schiff base-etched nickel foam; and 4) placing the Schiff base-etched nickel foam in a protective atmosphere for carbonization to obtain the nickel foam electrocatalyst. With pores formed by Schiff base etching, the nickel foam electrocatalyst in the solution has a large specific surface area, simple to prepare, and features good electrocatalytic oxidation performance for urea and ethanol, therefore, it can be used as an electrocatalyst for direct fuel cells.

Research on nickel-based (Ni-based) catalysts also includes improvements to the electrode structure, such as setting up an electrode functional layer and an electrode support layer. The electrode functional layer is configured as a sponge-like porous structure, while the electrode support layer is configured as a strip-shaped horizontal pore structure mixed with dense small pores, which can increase the specific surface area of the electrode, and increase the number of active reaction sites. Further, the electrode support layer can facilitate current collection and gas diffusion, and improve a reaction rate in a bubble accumulation region, thereby effectively improving the catalytic efficiency of the Ni-based catalysts. However, the existing Ni-based catalysts still have shortcomings in terms of output performance, preparation methods, material selection, cost and the like, needing further improvement.

In addition, from the perspective of hydrogen production, the hydrogen evolution reaction and oxygen evolution reaction in an electrochemical reaction of water hydrogen production also require catalysts to provide overpotential exceeding a theoretical decomposition voltage, such that power consumption is reduced, and efficiency of hydrogen production is improved.

Therefore, those skilled in the prior art are in an urgent need to solve the problem of developing an electrode catalyst with higher catalytic efficiency and a simpler preparation method based on the Ni-based catalysts to achieve efficient application of hydrogen energy.

SUMMARY

In order to solve the problems existing in the prior art, the present disclosure provides a nickel/nickel hydroxide electrode catalyst, including: a porous matrix structure obtained by drying and high-temperature processing of the raw material component, and a nanosheet obtained by thermal alkali treatment and electrochemical activation are doped in the porous matrix structure, where the nanosheet is doped in the porous matrix structure, a mass percentage of the porous matrix structure is 95%-99%, a mass percentage of the nanosheet is 1%-5%, and a mass density of the nanosheet is 12-15 mg/cm$^2$; and the porous matrix structure is nickel, and the nanosheet is nickel hydroxide in β configuration. The nickel/nickel hydroxide electrode catalyst generated in the present disclosure has higher catalytic efficiency, and is more convenient to prepare, thereby realizing more efficient application of hydrogen energy.

In a first aspect, the present disclosure provides a nickel/nickel hydroxide electrode catalyst, including: a porous matrix structure and a nanosheet, where the nanosheet is doped in the porous matrix structure, a mass percentage of the porous matrix structure is 95%-99%, a mass percentage of the nanosheet is 1%-5%, and a mass density of the nanosheet is 12-15 mg/cm$^2$; and the porous matrix structure is nickel, and the nanosheet is nickel hydroxide in β configuration.

Further, a thickness of the porous matrix structure is 100-700 μm.

Further, a thickness of the porous matrix structure is 300-400 μm.

Further, the nanosheet is of a hexagonal structure, a side length of the nanosheet of the hexagonal structure is 10-50 nm, and a thickness of the nanosheet of the hexagonal structure is 0.1-0.5 nm.

Further, an average side length of the nanosheet of the hexagonal structure is 30-35 nm, and an average thickness of the nanosheet of the hexagonal structure is 0.3-0.4 nm.

Further, an average pore size of the porous matrix structure is 0.1-0.5 μm.

In a second aspect, the present disclosure further provides a preparation method of a nickel/nickel hydroxide electrode catalyst, specifically including the following steps:

S1: preparing a Ni-based catalyst raw material component containing nickel oxide;

S2: placing the catalyst raw material component in an oven for drying and high-temperature treatment to obtain a porous matrix structure with a preset temperature; and S3: performing thermal alkaline treatment on the obtained porous matrix structure with the preset temperature, and carrying out electrochemical activation and drying to obtain the nickel/nickel hydroxide electrode catalyst, where the preset temperature of the porous matrix structure during thermal alkaline treatment is 80-120° C., Further, the step S1 specifically includes the following sub-steps:

S11: performing ball-milling of raw material to prepare catalyst slurry;

S12: performing tape casting to obtain catalyst raw material, and performing hot pressing and calcination to obtain a catalyst raw material sheet; and S13: performing calcination of the catalyst raw material sheet, and performing reduction and cleaning to obtain the nickel-based catalyst raw material component containing nickel oxide.

Further, the step S2 specifically includes the following sub-steps:

S21: placing the prepared Ni-based catalyst raw material component containing nickel oxide in an oven; and S22: raising a temperature of the oven to 80-100° C. for drying for 4-5 h, continuously raising the temperature up to 150-160° C. for high-temperature treatment for 5-6 h, and performing cooling to obtain the porous matrix structure with the preset temperature.

Further, the step S22 specifically includes:
the temperature is continuously raised up to 150-160° C. at a rate of 3-5° C./min.

Further, the step S3 specifically includes the following sub-steps:

S31: adding 25-35 wt. % of a strong alkali solution into an alkali-resistant corrosion container, heating up to 80-120° C., and keeping warm;

S32: place the obtained porous matrix structure with the preset temperature in an alkali-resistant corrosion container, seal and soak for 8-12 h to obtain a porous matrix structure containing a divalent nickel ion precursor, and take out the porous matrix structure containing a divalent nickel ion precursor; and S33: using the porous matrix structure containing the divalent nickel ion precursor as a working electrode, activating in a three-electrode system for a preset number of cycles through a cyclic voltammetry by setting a scanning voltage range, and washing and drying to obtain the nickel/nickel hydroxide electrode catalyst.

Further, the divalent nickel ion precursor is a mixture, including NiO, $Ni(OH)_2$, $Na_2[Ni(OH)_4]$.

In a third aspect, the present disclosure further provides an application of a nickel/nickel hydroxide electrode catalyst, and the above nickel/nickel hydroxide electrode catalyst is applied to an electrode of a fuel cell.

A nickel/nickel hydroxide electrode catalyst, a preparation method thereof and an application thereof provided in the present disclosure include at least the following beneficial effects:

(1) The nickel/nickel hydroxide electrode catalyst generated in the present disclosure has higher catalytic efficiency, and is more convenient to prepare, thereby realizing more efficient application of hydrogen energy.

(2) In terms of a physical structure, the porous matrix structure can facilitate current collection and gas diffusion, improve a reaction rate of a bubble aggregation area. The nanosheet is hexagonal, which can increase a specific surface area of the catalyst body, and increase the number of active reaction sites; and excessive nanosheet will affect gas diffusion, an appropriate proportion of the porous matrix structure and the nanosheet can jointly improve catalytic efficiency.

(3) In terms of a chemical structure, the nickel/nickel hydroxide electrode catalyst is composed of nickel/nickel hydroxide, the nickel itself has good catalytic performance, the nickel hydroxide has good stability and catalytic activity in an alkaline environment, and the nanosheet is doped in the porous matrix structure, which can improve the efficiency and stability of an overall structure of the catalyst, and can be used for a long time, featuring high temperature resistance and good economy.

(4) The nickel/nickel hydroxide electrode catalyst structure of the present disclosure has a simple structure, is convenient to use, and has a wide range of applications and broad market prospects. Further, the preparation method is simple in process, convenient and efficient, low in cost, free of pollution, economical and safe.

DETAILED DESCRIPTIONS OF THE EMBODIMENTS

Figure 1:
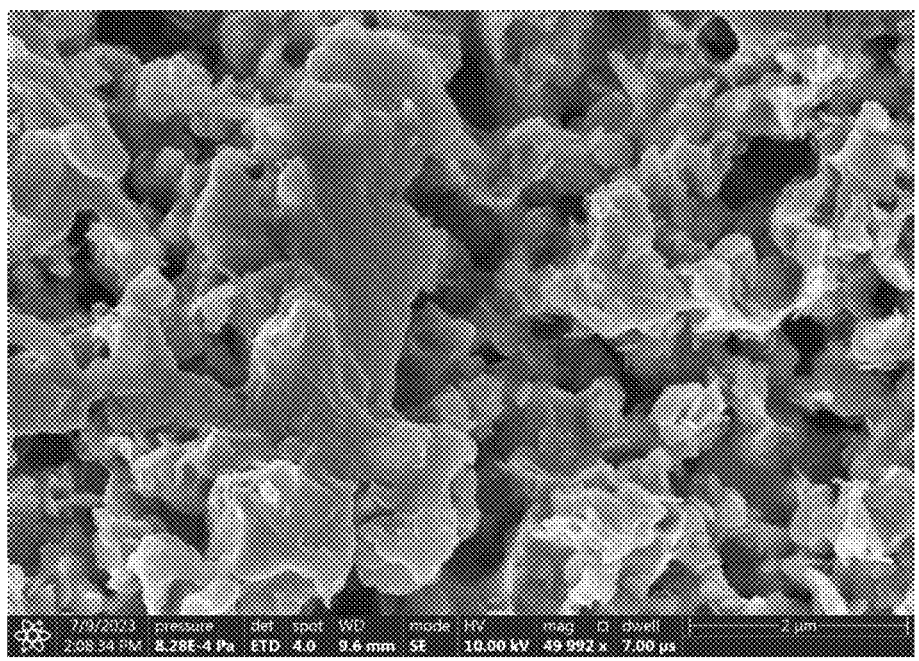
FIG. 1 is a schematic diagram of microscopic scanning of a porous matrix structure containing a divalent nickel ion precursor provided in Example 1 according to the present disclosure.

In order to better understand the above technical solution, the above technical solution will be described in detail below with reference to the accompanying drawings and specific implementations. Apparently, the examples described are merely some examples rather than all examples of the present disclosure. All the other embodiments obtained by those of ordinary skill in the art based on the embodiments in the present disclosure without creative efforts shall fall within the protection scope of the present disclosure.

The terms used in the embodiment of the present disclosure are merely for the purpose of describing specific embodiments, and not intended to limit the present disclosure. As used in the examples and the appended claims of the present disclosure, singular forms "a", "said" and "the" are intended to include plural forms as well, unless the context clearly indicates otherwise, "a plurality of" generally contains at least two types.

It should be noted that terms "comprising", "including" or any other variants thereof are intended to cover the non-exclusive including, thereby making that the goods or apparatus comprising a series of elements comprise not only those elements but also other elements that are not listed explicitly or the inherent elements to the goods or apparatus. Without further limitations, an element limited by the phrase "comprising/including a" does not exclude that there exists another same element in the goods or apparatus comprising the element.

A fuel cell realizes the conversion of chemical energy to electric energy through an electrochemical reaction. Therefore, the issue of improving the performance of the fuel cell is usually analyzed from the perspective of active sites of the electrochemical reaction and reactive gas mass transfer.

During the electrochemical reaction of the fuel cell, the required actual potential is always higher than the theoretical potential, for example, electron transfer of an electrode, diffusion of electrolyte ions, and ohmic resistance generated by a gas flow further increase the desired potential of the fuel cell. Therefore, overpotential between desired potential and theoretical potential provided by an anode and a cathode in the catalytic process needs to be used by using a catalyst.

From the perspective of the reactive gas mass transfer, gas atoms providing fuel, especially a catalyst structure of an anode, can have good adsorption and desorption capabilities by reasonably designing a catalyst structure, which cannot only increase mass load of the electrocatalyst, but also promote the desorption and diffusion of the generated gas, thereby being beneficial to improving the reaction performance of the fuel cell.

However, with the accumulation of residual fuel gas during the energy conversion process, a Ni-based catalyst, as an anode material, can transition from an ordered structure to an amorphous structure, resulting in a reduction in strength and toughness, thereby reducing the reaction efficiency of the fuel cell. Important research directions for improving fuel cell reaction performance include reducing a proportion of Ni in an alloy catalyst, improving a structure of the catalyst, developing a novel anode material, and optimizing operating parameters of the fuel cell.

Therefore, from the perspective of improving the structure of the catalyst and developing the novel anode material, the present disclosure provides a nickel/nickel hydroxide electrode catalyst, including: a porous matrix structure and a nanosheet, where the nanosheet is doped in the porous matrix structure, a mass percentage of the porous matrix structure is 95%-99%, a mass percentage of the nanosheet is 1%-5%, and a mass density of the nanosheet is 12-15 mg/cm$^2$; and the porous matrix structure is nickel, and the nanosheet is nickel hydroxide in β configuration.

Further, a thickness of the porous matrix structure is 100-700 μm.

Further, a thickness of the porous matrix structure is 300-400 μm.

Further, the nanosheet is of a hexagonal structure, a side length of the nanosheet of the hexagonal structure is 10-50 nm, and a thickness of the nanosheet of the hexagonal structure is 0.1-0.5 nm.

Further, an average side length of the nanosheet of the hexagonal structure is 30-35 nm, and an average thickness of the nanosheet of the hexagonal structure is 0.3-0.4 nm.

Further, an average pore size of the porous matrix structure is 0.1-0.5 μm.

The nickel/nickel hydroxide electrode catalyst generated in the present disclosure has higher catalytic efficiency, and is more convenient to prepare, thereby realizing more efficient application of hydrogen energy. In terms of a physical structure, the porous matrix structure can facilitate current collection and gas diffusion, improve a reaction rate of a bubble aggregation area. The nanosheet is hexagonal, which can increase a specific surface area of the catalyst body, and increase the number of active reaction sites, and the porous matrix structure and the nanosheet can jointly improve catalytic efficiency. In terms of a chemical structure, the nickel/nickel hydroxide electrode catalyst is composed of nickel/nickel hydroxide, the nickel itself has good catalytic performance, the nickel hydroxide has good stability and catalytic activity in an alkaline environment, and the nanosheet is doped in the porous matrix structure, which can improve the efficiency and stability of an overall structure of the catalyst, and can be used for a long time, featuring high temperature resistance and good economy.

In a second aspect, the present disclosure further provides a preparation method of a nickel/nickel hydroxide electrode catalyst, specifically including the following steps:
S1: prepare a Ni-based catalyst raw material component containing nickel oxide;
S2: place the catalyst raw material component in an oven for drying and high-temperature treatment to obtain a porous matrix structure with a preset temperature; and
S3: perform thermal alkaline treatment on the obtained porous matrix structure with the preset temperature, and carry out electrochemical activation and drying to obtain the nickel/nickel hydroxide electrode catalyst, where the preset temperature of the porous matrix structure during thermal alkaline treatment is 80-120° C., and a solution for the thermal alkaline treatment is a strong alkaline solution. The strong alkaline solution can be a NaOH solution or other strong alkaline solutions, such as a KOH solution.

Further, the step S1 specifically includes the following sub-steps:
S11: perform ball-milling of raw material to prepare catalyst slurry;
S12: perform tape casting to obtain catalyst raw material, and performing hot pressing and calcination to obtain a catalyst raw material sheet; and
S13: perform calcination of the catalyst raw material sheet, and performing reduction and cleaning to obtain the nickel-based catalyst raw material component containing nickel oxide.

Further, the step S11 specifically includes the following sub-steps:
S111: obtain a grinding medium, and place the grinding medium into a specific container;
S112: add a first raw material into the specific container, and grind the first raw material using the grinding medium to enable the first raw material to be mixed;

S113: seal the specific container in which the first raw material is mixed, and perform first ball milling on the sealed specific container;

S114: add a second raw material into the specific container after ball milling to enable the second raw material to be mixed with the first raw material, and then add a third raw material into the specific container to enable the third raw material to be mixed with the mixed second raw material and the first raw material; and S115: seal the specific container in which the third raw material is mixed, and perform second ball milling on the sealed specific container to obtain the catalyst slurry.

Further, the grinding medium is large zirconia balls and small zirconia balls, and a mass ratio of the large zirconia balls to the small zirconia balls is 1:(2-4), the first raw material includes nickel oxide powder, xylene, ethanol, and fish oil (a molar ratio of components of the first raw material is approximately 10:3:3:1), the second raw material includes an aqueous polyaleneglycol and benzyl butyl phthalate (BBP) (a molar ratio of components of the second raw material is approximately 3:4), the third raw material is polyvinyl butyral ester, the specific container is a polyethylene wide-mouth bottle, a rotational speed of the first ball milling is 350-400 rpm, the first ball milling lasts for 21-27 h, a rotational speed of the second ball milling is 350-400 rpm, and the second ball milling lasts for 21-27 h. Specifically, a molar ratio of the first raw material, the second raw material and the third raw material is approximately 20:7:3.

Further, the step S12 specifically includes the following sub-steps:

S121: pour the catalyst slurry onto a casting film tape;

S122: adjust a thickness of the casting film tape after casing to a specific size by using a cutter, and set a running speed of the casting film tape to complete the casting;

S123: dry the casting film tape after casting to obtain the casting film tape formed by tape casting;

S124: peel off the casting film tape formed by the tape casting to obtain catalyst raw material;

S125: stack the catalyst raw material to form a lamination, and perform hot pressing of the lamination to generate an initial catalyst raw material sheets; and S126: stamp the initial catalyst raw material sheet to obtain a catalyst raw material sheet with a target size and a shape.

Further, the cutter is a flat scraper, and specific dimensions are as follows: the thickness of the casting film tape is 50-90 μm, the running speed of the casting film tape is 0.2-0.4 r/s, a temperature of the hot pressing is 80-100° C., a pressure of the hot pressing is 9-11 MPa, and the pressure of the hot pressing lasts for 16-20 min.

Further, the step S13 specifically includes the following sub-steps:

S131: place the catalyst raw material sheet into a muffle furnace for calcination at a calcination temperature of 600-1000° C. for 3-5 h; and S132: place the calcined catalyst raw material sheet into a tubular furnace in a reducing atmosphere for reduction at a reduction temperature of 250-350° C. for 5.5-6.5 h, and then clean to prepare the Ni-based catalyst raw material component containing nickel oxide.

Since the reduction temperature is set to low, the calcined catalyst raw material sheet is not completely reduced, and the obtained Ni-based catalyst raw material component still contains nickel oxide. The nickel oxide can be converted to nickel hydroxide nanosheet in subsequent thermal alkaline treatment and electrochemical activation.

Further, the step S2 specifically includes the following sub-steps:

S21: place the prepared Ni-based catalyst raw material component containing nickel oxide in an oven; and S22: raise a temperature of the oven to 80-100° C. for drying for 4-5 h, continuously raise the temperature up to 150-160° C. for high-temperature treatment for 5-6 h, and perform cooling to obtain the porous matrix structure with the preset temperature.

Further, the step S22 specifically includes the following sub-step:

the temperature is continuously raised up to 150-160° C. at a rate of 3-5° C./min.

Further, the step S3 specifically includes the following sub-steps:

S31: add 25-35 wt. % of a strong alkali solution into an alkali-resistant corrosion container, heat up to 80-120° C., and keep warm;

S32: place the obtained porous matrix structure with the preset temperature in an alkali-resistant corrosion container, seal and soak for 8-12 h to obtain a porous matrix structure containing a divalent nickel ion precursor, and take out the porous matrix structure containing a divalent nickel ion precursor; and S33: use the porous matrix structure containing the divalent nickel ion precursor as a working electrode, activate in a three-electrode system for a preset number of cycles through a cyclic voltammetry by setting a scanning voltage range, and wash and dry to obtain the nickel/nickel hydroxide electrode catalyst.

Further, the step S33 specifically includes: a reference electrode in the three-electrode system is Hg/HgO, a counter electrode is a Pt plate, a scanning rate of the cyclic voltammetry is 18-23 mV/s, and a scanning voltage range is 0-(0.7-1) V (vs Hg/HgO).

Further, the divalent nickel ion precursor is a mixture, including NiO, $Ni(OH)_2$, $Na_2[Ni(OH)_4]$.

The nickel oxide in the Ni-based catalyst raw material component undergoes a reaction similar to hydrothermal treatment of nickel salt and amines added in a hot alkali solution for hydrothermal treatment, NaOH is taken as the hot alkali for an example, and a chemical reaction formula of nickel oxide and NaOH is as follows: $NiO+2NaOH \rightarrow Na_2[Ni(OH)_4]+H_2O$; and $NiO+2NaOH \rightarrow Ni(OH)_2+Na_2O$.

A reaction process of the nickel oxide and the hot alkali is relatively complicated, and the reaction process depends on temperature, pressure, physical state and concentration of reactants, and other factors. The porous matrix structure prepared by the present disclosure is rough and porous, which can increase a reaction specific surface area of the nickel oxide, and increase a reaction contact area of the hot alkali and the nickel oxide. In addition, an increase in the temperature can accelerate a reaction rate, but the thermal alkaline treatment is insufficient to fully convert the nickel oxide into the nickel hydroxide, and only the divalent nickel ion precursor blended with the nickel oxide, the nickel salt and the nickel hydroxide is generated.

Then, the divalent nickel ion precursor generates the nickel hydroxide in β configuration through the activity of the three-electrode system.

A structure of nickel/nickel hydroxide can not only exhibit the characteristics of the porous matrix material formed by nickel, but also have the advantages of high stability and high catalytic activity of nickel hydroxide.

In a third aspect, the present disclosure further provides an application of a nickel/nickel hydroxide electrode catalyst, and the above nickel/nickel hydroxide electrode catalyst is applied to an electrode of a fuel cell.

Example 1

In Example 1, a preparation method of a nickel/nickel hydroxide electrode catalyst specifically includes the following steps:

S1: a Ni-based catalyst raw material component containing nickel oxide was prepared;

S11: raw material was subjected to ball milling to prepare catalyst slurry; large zirconia balls and small zirconia balls at a mass ratio of 1:3 were placed into a polyethylene wide-mouth bottle; fish oil was weighed and taken with a rubber dropper, and dropped into the polyethylene wide-mouth bottle, xylene was then measured and poured into the polyethylene wide-mouth bottle, the polyethylene wide-mouth bottle was sealed and stirred for 5 min to make the fish oil and the xylene dissolved completely, and ethanol was measured and poured into the polyethylene wide-mouth bottle and stirred for 3 min to make the ethanol and the xylene dissolved completely; nickel oxide powder was weighed and poured into the polyethylene wide-mouth bottle, sealed and stirred for 3 min to make the nickel oxide powder and the solvent mixed fully; the polyethylene wide-mouth bottle was sealed with a sealing tape and placed into a ball mill for ball milling for 24 h, and a rotational speed of the ball mill was set to 375 r/min; the polyethylene wide-mouth bottle was then taken out, and the sealing tape was removed, benzyl butyl phthalate (BBP) and aqueous polyaleneglycol (PAG) were added dropwise into the polyethylene wide-mouth bottle, stirred for 3 min and mixed fully; PVB (polyvinyl butyral ester) was then added dropwise and stirred for 5 min; after stirring was completed, the polyethylene wide-mouth bottle was then sealed and placed into the ball mill for ball milling for 24 h, and a rotational speed of the ball mill was set to 375 r/min; and a preparation of the catalyst slurry was completed.

S12: tape casting was performed to obtain catalyst raw material, which was subjected to hot pressing and calcination to obtain a catalyst raw material sheet: before the tape casting, a cutter and a table surface of a casting machine were cleaned, the catalyst slurry was stably poured on a casting film tape, a thickness of the casting film tape was adjusted to be 70 μm by using the cutter with adjustable gap height, and a running speed of the casting film tape was set to 0.3 r/s; upon completion of the tape casting, the casting film tape was statically placed in the casting machine, an exhaust device was turned on to naturally dry at room temperature for 30 min to obtain the casting film tape formed by casting; the catalyst slurry from the tape casting was removed from the casting film tape, squares with a specific size were drawn on a back surface of the casting film tape by using a permanent marker pen, diaphragms with a specific size were cut, the catalyst raw material was peeled off from the diaphragm to obtain the catalyst raw material after tape casting.

A plurality of catalyst raw material were stacked, and a thickness after stacking was measured with a vernier caliper; and when the thickness thereof was about 0.72 mm, the preparation of stacked samples was completed. When the thickness thereof was less than 0.72 mm, and the difference was great, the catalyst raw material with the casting film tape peeled off can be added to make the thickness reach 0.72 mm. The stacked samples were smoothly moved to a hot press, and direct contact between the stacked samples and the hot press could cause damage to a physical structure of the stacked samples, therefore, a piece of casting film tape was placed above and below the stacked samples to protect the physical structure of the stacked samples from being damaged, and a temperature of the hot press was set to 90° C., a pressure was set to 10 Mpa and maintained for 18 min, such that an initial catalyst raw material sheet was obtained.

The initial catalyst raw material sheet was processed into a proper size and shape by using a stamping process. First, a protective film tape on two ends of the initial catalyst raw material sheet was removed, the initial catalyst raw material sheet after hot pressing was placed on a clean hard plate, stamping was performed by using a belt punch with a blade length of 25 mm to obtain a catalyst raw material sheet with a square length of 25 mm, and the size and the shape of the catalyst raw material sheet could be determined according to actual needs.

S13: the catalyst raw material sheet was calcined, and reduction and cleaning were performed to obtain the nickel-based catalyst raw material component containing nickel oxide:

the obtained catalyst raw material sheet was flatly placed on a clean zirconia substrate and placed into a muffle furnace, kept at 600° C. for 1 h, and sintered at 1100° C. for 4 h.

The calcined zirconia substrate loaded with the catalyst raw material sheet was taken out from the muffle furnace, the zirconia substrate with the catalyst raw material sheet was loaded into a tubular furnace in flowing ultra-high purity hydrogen, and reduced for 6 h at a temperature of 300° C.

S2: a porous matrix structure with a preset temperature was prepared:

the prepared catalyst raw material was placed into an oven, a temperature of the oven was raised to 100° C. for drying for 4 h, the temperature of the oven was continuously raised up to 150° C. for high-temperature treatment for 6 h, and cooling was performed to obtain the porous matrix structure with the preset temperature, where the temperature was continuously raised up to 150° C. at a rate of 3° C./min.

S3: a nickel/nickel hydroxide electrode catalyst was prepared:

30 wt. % of a NaOH solution was added into an alkali-resistant corrosion container, which was then placed into an oven at 100° C. for heating and insulation; and the obtained porous matrix structure with a residual temperature of 100° C. was placed into an alkali-resistant corrosion container, sealed and soaked for 10 h to obtain a porous matrix structure containing a divalent nickel ion precursor (a morphology of a microstructure thereof was shown in FIG. 1), and the porous matrix structure containing a divalent nickel ion precursor was then taken out). The microscopic morphology of the divalent nickel ion precursor exhibited surface edges and corners, which was similar to "alkaline etching".

Figure 2:
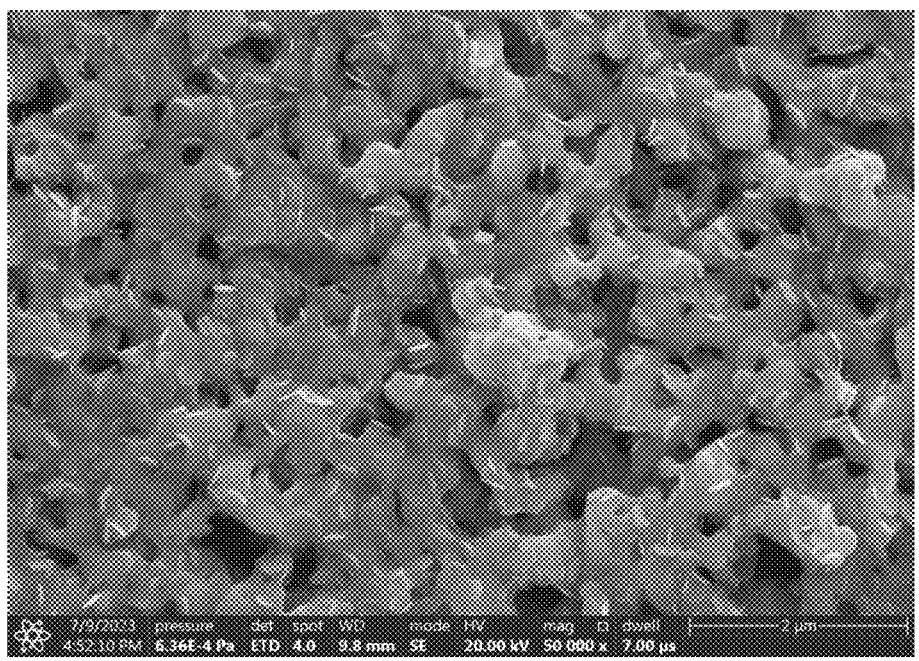
FIG. 2 is a schematic diagram of microscopic scanning of a nickel/nickel hydroxide electrode catalyst provided in Example 1 according to the present disclosure.

A reference electrode in the three-electrode system was Hg/HgO, a counter electrode was a Pt plate, the porous matrix structure containing the divalent nickel ion precursor was used as a working electrode, a scanning rate of the cyclic voltammetry was 20 mV/s, a scanning voltage range was 0-0.7 V (vs Hg/HgO), 10 cyclic voltammetry scans were performed, washing and drying were performed to obtain the nickel/nickel hydroxide electrode catalyst, and a morphology of a microstructure thereof was shown in FIG. 2.

The nickel/nickel hydroxide electrode catalyst prepared according to the above steps included a porous matrix structure and a nanosheet, where the nanosheet was of a hexagonal structure, the nanosheet was doped in the porous matrix structure, a mass percentage of the porous matrix structure was 98%, a mass percentage of the nanosheet was 2%, and an average mass load of the nanosheet was 14 mg/cm$^2$; and the porous matrix structure is nickel, and the nanosheet is nickel hydroxide in β configuration.

A thickness of the porous matrix structure was 400 μm, and an average pore size of the porous matrix structure was 0.3 μm.

An average side length of the nanosheet of the hexagonal structure was 33 nm, and an average thickness of the nanosheet of the hexagonal structure was 0.33 nm.

Example 2

On the basis of Example 1, the following parameters were adjusted in Example 2.

Compared with the preparation process of Example 1, in the step S31 of this Example, 25 wt. % of NaOH was added to an alkali-resistant corrosion container.

The nickel/nickel hydroxide electrode catalyst prepared according to the above steps included a porous matrix structure and a nanosheet, where the nanosheet was of a hexagonal structure, the nanosheet was doped in the porous matrix structure, a mass percentage of the porous matrix structure was 99%, a mass percentage of the nanosheet was 1%, and an average mass load of the nanosheet was 12 mg/cm$^2$; and the porous matrix structure is nickel, and the nanosheet is nickel hydroxide in β configuration.

A thickness of the porous matrix structure was 400 μm, and an average pore size of the porous matrix structure was 0.3 μm.

An average side length of the nanosheet of the hexagonal structure was 32 nm, and an average thickness of the nanosheet of the hexagonal structure was 0.32 nm.

Example 3

On the basis of Example 1, the following parameters were adjusted in Example 3.

Compared with the preparation process of Example 1, in the step S31 of this Example, 35 wt. % of NaOH was added to an alkali-resistant corrosion container.

The nickel/nickel hydroxide electrode catalyst prepared according to the above steps included a porous matrix structure and a nanosheet, where the nanosheet was of a hexagonal structure, the nanosheet was doped in the porous matrix structure, a mass percentage of the porous matrix structure was 96%, a mass percentage of the nanosheet was 4%, and an average mass load of the nanosheet was 15 mg/cm$^2$; and the porous matrix structure is nickel, and the nanosheet is nickel hydroxide in β configuration.

A thickness of the porous matrix structure was 400 μm, and an average pore size of the porous matrix structure was 0.3 μm.

An average side length of the nanosheet of the hexagonal structure was 30 nm, and an average thickness of the nanosheet of the hexagonal structure was 0.32 nm.

Example 4

On the basis of Example 1, the following parameters were adjusted in Example 4.

Compared with the preparation process of Example 1, in the step S33 of this Example, a scanning voltage range was 0-1 V (vs Hg/HgO).

The nickel/nickel hydroxide electrode catalyst prepared according to the above steps included a porous matrix structure and a nanosheet, where the nanosheet was of a hexagonal structure, the nanosheet was doped in the porous matrix structure, a mass percentage of the porous matrix structure was 96%, a mass percentage of the nanosheet was 4%, and an average mass load of the nanosheet was 15 mg/cm$^2$; and the porous matrix structure is nickel, and the nanosheet is nickel hydroxide in β configuration.

A thickness of the porous matrix structure was 400 μm, and an average pore size of the porous matrix structure was 0.3 μm.

An average side length of the nanosheet of the hexagonal structure was 30 nm, and an average thickness of the nanosheet of the hexagonal structure was 0.33 nm.

Comparative Example 1

On the basis of Example 1, the following parameters were adjusted in Comparative Example 1.

Compared with the preparation process of Example 1, in the step S13 of this Comparative Example, the zirconia substrate with the catalyst raw material sheet was loaded into a tubular furnace and reduced for 6 h at a temperature of 500° C. to obtain a Ni-based sponge-like porous structure. Steps S2 and S3 were omitted. The Ni-based sponge-like porous structure was used as an anode material of a fuel cell to facilitate electrochemical characterization of the fuel cell.

Comparative Example 2

On the basis of Example 1, the following parameters were adjusted in Comparative Example 2.

Compared with the preparation process of Example 1, in the step S13 of this Comparative Example, the zirconia substrate with the catalyst raw material sheet was loaded into a tubular furnace and reduced for 6 h at a temperature of 500° C. to obtain a Ni-based catalyst raw material component. Steps S2 and S3 were performed to obtain a Ni-based sponge-like porous structure, but no nickel/nickel hydroxide electrode catalyst was obtained. The Ni-based sponge-like porous structure was used as an anode material of a fuel cell to facilitate electrochemical characterization of the fuel cell.

Comparative Example 3

On the basis of Example 1, the following parameters were adjusted in Comparative Example 3.

Compared with the preparation process of Example 1, step S33 was omitted in this Comparative Example, a porous matrix structure containing a divalent nickel ion precursor was obtained, and the porous matrix structure containing the divalent nickel ion precursor was used as an anode material of a fuel cell to facilitate electrochemical characterization of the fuel cell.

Comparative Example 4

On the basis of Example 1, the following parameters were adjusted in Comparative Example 4.

Compared with the preparation process of Example 1, in the step S33 of this Comparative Example, 20 cyclic voltammetry scans were performed, and washing and drying were performed to obtain a nickel/nickel oxide/nickel hydroxide structure.

The obtained nickel/nickel oxide/nickel hydroxide structure was used as an anode material of a fuel cell to facilitate electrochemical characterization of the fuel cell.

Comparative Example 5

On the basis of Example 1, the following parameters were adjusted in Comparative Example 5.

Compared with the preparation process of Example 1, in the step S33 of this Comparative Example, 5 cyclic voltammetry scans were performed, and washing and drying were performed to obtain a nickel/nickel hydroxide structure; and the nickel/nickel hydroxide structure obtained in this Comparative Example was characterized, indicating that a mass percentage of the nickel hydroxide was less than 1%, approximating to 0.5%.

Comparative Example 6

On the basis of Example 1, the following parameters were adjusted in Comparative Example 6.

Compared with the preparation process of Example 1, in the step S33 of this Comparative Example, a scanning voltage range was 0-1.5 V (vs Hg/HgO), and washing and drying were performed to obtain a nickel/nickel oxide/nickel hydroxide structure.

The obtained nickel/nickel oxide/nickel hydroxide structure was used as an anode material of a fuel cell to facilitate electrochemical characterization of the fuel cell.

Comparative Example 7

On the basis of Example 1, the following parameters were adjusted in Comparative Example 7.

Compared with the preparation process of Example 1, in the step S31 of this Example, 30 wt. % of a NaOH solution was added into an alkali-resistant corrosion container, which was then placed into an oven at 50° C. for heating and insulation
to obtain a nickel/nickel hydroxide structure; and the nickel/nickel hydroxide structure obtained in this Comparative Example was characterized, indicating that a mass percentage of the nickel hydroxide was less than 1%, approximating to 0.3%.

Comparative Example 8

On the basis of Example 1, the following parameters were adjusted in Comparative Example 8.

Compared with the preparation process of Example 1, in the step S31 of this Comparative Example, 20 wt. % of a NaOH solution was added into an alkali-resistant corrosion container to obtain a nickel/nickel hydroxide structure; and the nickel/nickel hydroxide structure obtained in this Comparative Example was characterized, indicating that a mass percentage of the nickel hydroxide was less than 1%, approximating to 0.5%.

Comparative Example 9

On the basis of Example 1, the following parameters were adjusted in Comparative Example 9.

Compared with the preparation process of Example 1, in the step S31 of this Comparative Example, 40 wt. % of a NaOH solution was added to an alkali-resistant corrosion container to obtain a nickel/nickel hydroxide structure; and the nickel/nickel hydroxide structure obtained in this Comparative Example was characterized, indicating that a mass percentage of the nickel hydroxide was higher than 5%, approximating to 7%.

Test Process:

The products prepared in Examples 1-4 and Comparative Examples 1-9 were separately used as an anode material of a fuel cell to perform measurement of a volt-ampere characteristic curve of electrochemical characterization of the fuel cell.

Testing conditions were as follows: an operating condition temperature of the fuel cell was 80° C., a gas back pressure on both sides of the fuel cell was 0.2 MPa, fully humidified hydrogen and oxygen were input at a flow rate of 500 mL/min, and correspondingly, voltage change response signals were collected to test an I-V (current-voltage) curve graph and a power density curve graph, respectively.

TABLE 1

|  | Power density ($mW/cm^2$) |
|---|---|
| Example 1 | 255 |
| Example 2 | 211 |
| Example 3 | 223 |
| Example 4 | 225 |
| Comparative Example 1 | 140 |
| Comparative Example 2 | 143 |
| Comparative Example 3 | 165 |
| Comparative Example 4 | 170 |
| Comparative Example 5 | 182 |
| Comparative Example 6 | 172 |
| Comparative Example 7 | 181 |
| Comparative Example 8 | 185 |
| Comparative Example 9 | 185 |

It can be seen from the test results in Table 1:

regarding the power density, a most important parameter of the fuel cell, maximum power densities of the fuel cells using the nickel/nickel hydroxide electrode catalyst in Examples 1-4 were all higher than 210 $mW/cm^2$.

Figure 3:
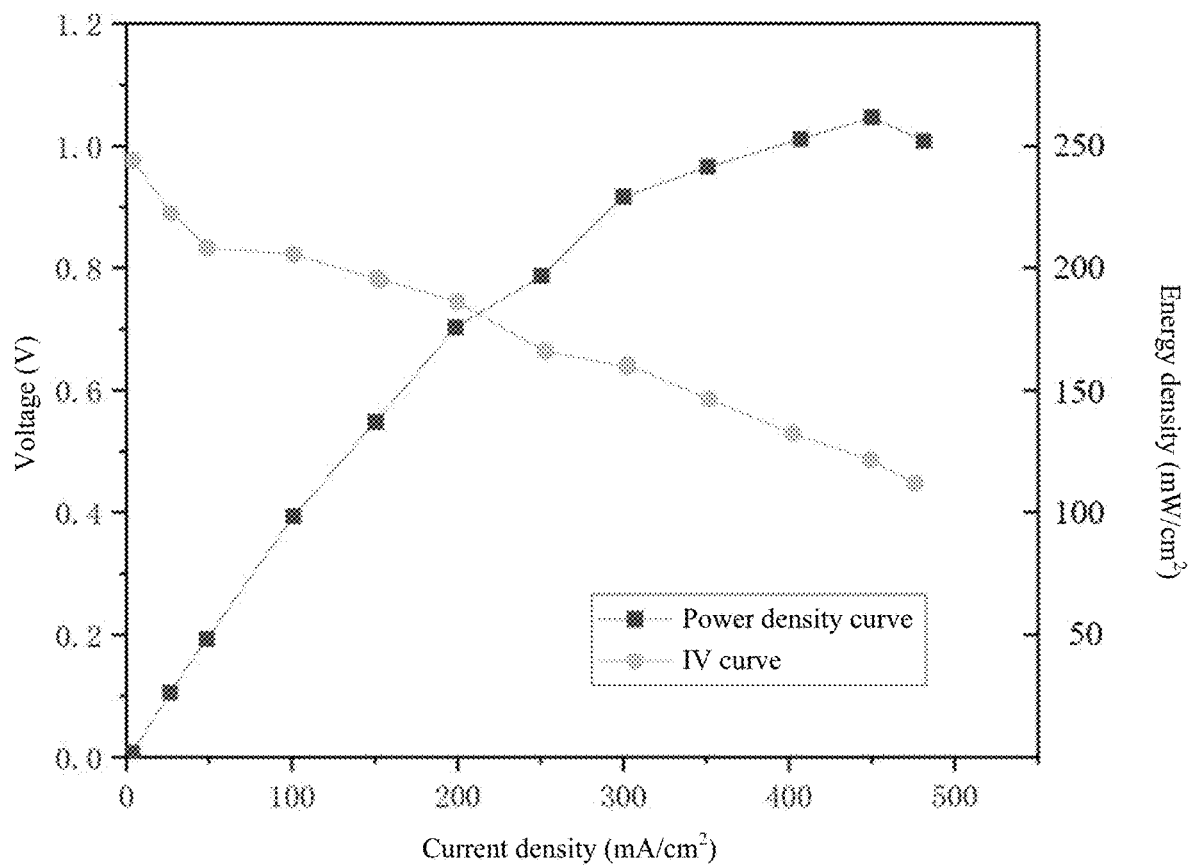
FIG. 3 is a diagram showing energy density test results of using the nickel/nickel hydroxide electrode catalyst provided in Example 1 of the present disclosure as an anode material of a fuel cell.

Taking the test chart of Example 1 (FIG. 3) as an example, a black curve was the power density curve, and a gray curve was the I-V curve; and the performance of the fuel cell could be summarized by the I-V curve, showing a voltage output of the fuel cell at a given current output. When the current of the fuel cell was characterized, the current was generally standardized according to an effective area of the fuel cell to obtain a current density (unit: $mA/cm^2$). When comparing the performance of different fuel cells, the I-V curve characterized by the current density made the results comparable. In practical application of the fuel cell, the actual voltage output of the fuel cell was less than the ideal thermodynamic voltage. In addition, the more the current output of the fuel cell was, the lower the output voltage of the fuel cell became, thereby limiting the total power that can be released.

The power released by the fuel cell released was P=I–V. In the above I-V curve, the power density curve could be obtained by multiplying a voltage value at each point by the corresponding current density value, and a maximum power density value in Example 1 was 255 $mW/cm^2$.

The products of Comparative Examples 1-9 were used as the fuel cell of the electrode catalyst, and maximum power densities thereof were all lower than 190 $mW/cm^2$, far less than those of the fuel cells of the nickel/nickel hydroxide electrode catalyst given in the Examples.

In addition, the products prepared in Examples 1-4 and Comparative Examples 1-9 were used as cathode and anode catalyst electrodes of an electrolytic cell, respectively to test the I-V graph. Test conditions were as follows: an operating condition temperature of the electrolytic cell was 80° C., two sides of the electrolytic cell were operated at normal temperature and normal pressure, parameters of the power supply used were adjusted, such that the voltage gradually increased from 1.4 V, voltage change response signals were collected, current values that changed with the voltage were tested, an I-V curve was given, and when the voltage was increased to 1.8 V, specific data of the current density were shown in Table 2.

TABLE 2

|  | Current density reached at 1.8V (A/cm$^2$) |
| --- | --- |
| Example 1 | 1.7 |
| Example 2 | 1.5 |
| Example 3 | 1.6 |
| Example 4 | 1.6 |
| Comparative Example 1 | 0.9 |
| Comparative Example 2 | 1.0 |
| Comparative Example 3 | 1.1 |
| Comparative Example 4 | 1.0 |
| Comparative Example 5 | 1.2 |
| Comparative Example 6 | 1.0 |
| Comparative Example 7 | 1.2 |
| Comparative Example 8 | 1.2 |
| Comparative Example 9 | 1.0 |

It can be seen from the test results in Table 2:

The nickel/nickel hydroxide electrode catalyst in Examples 1-4 were used, the current density reached at 1.8 V was not less than 1.5 A/cm$^2$, and the products in Comparative Examples 1-9 were used, the current density reached at 1.8 V was not higher than 1.2 A/cm$^2$.

The nickel/nickel hydroxide electrode catalyst provided in the present disclosure has excellent catalytic performance, attributable to the following reasons: first, in the nickel/nickel hydroxide electrode catalyst structure of the present disclosure, the nanosheet is doped on the basis of the porous matrix structure, which can increase the specific surface area of the catalyst body, and increase the number of active reaction sites, resulting in a reduction in area specific resistance. Second, the nanosheet is densely doped structure, which is equivalent to forming a protective coating on the surface of the porous matrix structure, such that poor surface oxidation generated in the polarization process of the hydrogen oxidation reaction can be effectively alleviated, which cannot only improve the performance of the fuel cell, but also ensure the long-term stable operation of the fuel cell. At the same time, the protective coating formed by the nickel hydroxide nanosheet can also improve the tolerance of the fuel cell to CO, thereby enriching the types of application fuel in the fuel cell, for example, hydrogen containing trace CO can be used.

Compared with the existing pure Ni-based catalyst, the nickel/nickel hydroxide electrode catalyst provided in the present disclosure is more excellent and stable in performance, and compared with the common noble metal alkaline fuel cells available on the market, the cost of the non-noble metal material adopted by the nickel/nickel hydroxide electrode catalyst in the present disclosure is very low.

Although the preferential embodiments of the present disclosure have been described, those skilled in the art may make additional changes and modifications to these embodiments once they learn the basic inventive concept. Therefore, the appended claims are intended to be interpreted as including the preferential embodiments and all changes and modifications falling within the scope of the present disclosure. It will be apparent to those skilled in the art that various modifications and variations may be made to the present disclosure without departing from the spirit and scope of the present disclosure. Thus, it is intended that the present disclosure covers such modifications and variations which come within the scope of the appended claims and their equivalents.

What it claimed is:

1. A preparation method of a nickel/nickel hydroxide electrode catalyst, wherein the nickel/nickel hydroxide electrode catalyst comprises a porous matrix structure and a nanosheet, the nanosheet is doped in the porous matrix structure, wherein, for the entire nickel/nickel hydroxide electrode catalyst, a mass percentage of the porous matrix structure is 95%-99%, a mass percentage of the nanosheet is 1%-5%, and a mass density of the nanosheet is 12-15 mg/cm$^2$; and the porous matrix structure is nickel, and the nanosheet is nickel hydroxide in β configuration; wherein the preparation method specifically comprises the following steps:

S11: performing ball-milling of raw material to prepare catalyst slurry: placing large zirconia balls and small zirconia balls at a mass ratio of 1:(2-4) into a polyethylene wide-mouth bottle; weighing and taking fish oil with a rubber dropper, and dropping into the polyethylene wide-mouth bottle, measuring xylene and pouring the same into the polyethylene wide-mouth bottle, sealing the polyethylene wide-mouth bottle and stirring to make the fish oil and the xylene dissolved completely, and measuring ethanol and pouring the same into the polyethylene wide-mouth bottle and stirring to make the ethanol and the xylene dissolved completely; weighing nickel oxide powder and pouring the same into the polyethylene wide-mouth bottle, sealing and stirring to make the nickel oxide powder and solvent mixed fully; sealing the polyethylene wide-mouth bottle with a sealing tape and placing the same into a ball mill for ball milling for 21-27 h, and setting a rotational speed of the ball mill to 350-400 r/min; then taking out the polyethylene wide-mouth bottle, removing the sealing tape, adding benzyl butyl phthalate (BBP) and aqueous polyethylene glycol (PAG) dropwise into the polyethylene wide-mouth bottle, and stirring to make them mixed fully; adding PVB (polyvinyl butyral ester) into the same polyethylene wide-mouth bottle dropwise and stirring; and upon completion of stirring, sealing the polyethylene wide-mouth bottle and placing into the ball mill for ball milling for 21-27 h, and setting a rotational speed of the ball mill to 350-400 r/min; and completing a preparation of the catalyst slurry;

S12: performing tape casting with the catalyst slurry to obtain catalyst raw material, and performing hot pressing with the catalyst raw material to obtain a catalyst raw material sheet;

S131: placing the catalyst raw material sheet into a muffle furnace for calcination at a calcination temperature of 600-1000° C. for 3-5 h;

S132: placing the calcined catalyst raw material sheet into a tubular furnace in a reducing atmosphere for reduction at a reduction temperature of 250-350° C. for 5.5-6.5 h, and then cleaning to prepare the Ni-based catalyst raw material component containing nickel oxide;

S21: placing the prepared Ni-based catalyst raw material component containing nickel oxide in an oven;

S22: raising a temperature of the oven to 80-100° C. for drying for 4-5 h, continuously raising the temperature up to 150-160° C. for high-temperature treatment for 5-6 h, and performing cooling to obtain the porous matrix structure;

S31: adding 25-35 wt. % of NaOH solution into an alkali-resistant corrosion container, heating up to 80-120° C., and keeping warm;

S32: placing the obtained porous matrix structure with the preset temperature in the alkali-resistant corrosion container, sealing and soaking for 8-12 h to obtain a porous matrix structure containing a divalent nickel ion precursor, and taking out the porous matrix structure containing a divalent nickel ion precursor, wherein the preset temperature of the porous matrix structure during thermal alkaline treatment is 80-120° C.; and S33: using the porous matrix structure containing the divalent nickel ion precursor as a working electrode, activating in a three-electrode system for a preset number of cycles through a cyclic voltammetry by setting a scanning voltage range, and washing and drying to obtain the nickel/nickel hydroxide electrode catalyst; and the step S33 specifically comprises: a reference electrode in the three-electrode system is Hg/HgO, a counter electrode is a Pt plate, a scanning rate of the cyclic voltammetry is 18-23 mV/s, and a scanning voltage range is 0-(0.7-1) V.

2. The preparation method of a nickel/nickel hydroxide electrode catalyst according to claim 1, wherein a thickness of the porous matrix structure is 100-700 μm.

3. The preparation method of a nickel/nickel hydroxide electrode catalyst according to claim 1, wherein the nanosheet is of a hexagonal structure, a side length of the hexagonal structure is 10-50 nm, and a thickness of the hexagonal structure is 0.1-0.5 nm.

4. The preparation method of a nickel/nickel hydroxide electrode catalyst according to claim 1, wherein an average pore size of the porous matrix structure is 0.1-0.5 μm.

5. The preparation method of a nickel/nickel hydroxide electrode catalyst according to claim 1, wherein the step S22 specifically comprises:

the temperature is continuously raised up to 150-160° C. at a rate of 3-5° C./min.

\* \* \* \* \*